United States Patent Office 2,721,112
Patented Oct. 18, 1955

2,721,112

SOLUTIONS OF POLYACRYLONITRILE AND ACRYLONITRILE COPOLYMERS

John Downing, Arthur Hodge, and James Gordon Napier Drewitt, Spondon, near Derby, England, assignors to British Celanese Limited, a corporation of Great Britain No Drawing. Application June 14, 1951, Serial No. 231,665

Claims priority, application Great Britain, June 29, 1950

9 Claims. (Cl. 18—54)

This invention relates to solutions of polyacrylonitrile and of copolymers containing acrylonitrile as the preponderating constituent, and to the production from such solutions of shaped articles such as fibres and films.

A class of polymer of increasing importance consists of polyacrylonitrile and copolymers of acrylonitrile with other unsaturated compounds, especially vinyl compounds. Examples of such other unsaturated compounds are: substituted acrylonitriles, e. g. methacrylonitrile; vinyl esters, e. g. vinyl chloride and vinyl acetate; acrylic acid derivatives, e. g. methyl acrylate and phenyl acrylate; styrene and its derivatives; and vinylidene chloride. Polyacrylonitrile itself and such copolymers with other unsaturated compounds as contain a preponderating proportion of acrylonitrile are in the present specification referred to as acrylonitrile polymers. It is well known that acrylonitrile polymers, especially such as have fibre-forming properties, are in many cases insoluble in the organic liquids commonly employed as solvents, and that this constitutes a considerable difficulty in the way of utilising these polymers.

We have now found that acrylonitrile polymers, especially such as are fibre-forming, can be dissolved in solvents consisting of formic acid alone, aqueous formic acid of concentration at least 70%, anhydrous mixtures of formic acid with one or more substances capable by themselves of dissolving polyacrylonitrile, mixtures of formic acid and water with one or more substances capable by themselves of dissolving polyacrylonitrile, or mixtures of formic acid, oxalic acid, and water.

The invention is of particular value in the formation and use of solutions of polyacrylonitrile itself, and of such copolymers of acrylonitrile and other unsaturated compounds as are insoluble in acetone. Examples of such copolymers are copolymers containing 85% or more of acrylonitrile and 15% or less of vinyl chloride, or 60% or more of acrylonitrile and 40% or less of methacrylonitrile. Such copolymers are as a rule easier or at least no more difficult to dissolve in the solvents of the invention than is polyacrylonitrile itself, and it will therefore be convenient in describing the invention in more detail to refer specifically to polyacrylonitrile.

While polyacrylonitrile may be dissolved in anhydrous formic acid or aqueous formic acid of concentration above 70%, preferably about 80–90%, we prefer to use solvent mixtures in which the formic acid is present in association with another substance capable by itself of dissolving polyacrylonitrile, or with oxalic acid, since such mixtures are in general capable of dissolving polyacrylonitrile at lower temperatures than are the anhydrous and aqueous formic acids.

When another substance capable by itself of dissolving polyacrylonitrile is to be employed, it is particularly advantageous to use a cyclic compound containing the group —CO.O— in the ring. Examples of such compounds are cyclic anhydrides of dicarboxylic acids, for example maleic, succinic and glutaric anhydrides; lactones, for example gamma-butyrolactone and gamma- and delta-valerolactones; and cyclic carbonates of glycols such for example as cyclic ethylene carbonate; we have found in particular that mixtures of formic acid and maleic anhydride, and mixtures of formic acid and ethylene glycol carbonate, are particularly useful solvents. Mixtures of formic acid and maleic anhydride preferably contain between 50 and 80% of formic acid, and between 50 and 20% of maleic anhydride by volume, mixtures containing 55–65% of formic acid and 45–35% of maleic anhydride being particularly useful. When ethylene glycol carbonate is used the solvent mixture preferably contains at least 45% of this compound, and at most 55% of formic acid. For example mixtures containing 50–65% of ethylene glycol carbonate and 50–35% of formic acid may be used. (All proportions, unless otherwise stated, are percentages by weight.)

Another solvent mixture which we have found to be very useful comprises formic acid, oxalic acid and water. Examples of suitable mixtures are mixtures containing 20–40% of formic acid, 60–45% of oxalic acid, and 25–10% of water.

The polyacrylonitrile may be dissolved in the solvent, for example, by adding it to the required amount of the solvent and heating the mixture. When anhydrous or aqueous formic acid alone is used as the solvent, the polyacrylonitrile may be dissolved at temperatures above about 120° C., especially between 120° and 190° C.; when the solvent contains, besides formic acid, another compound capable by itself of dissolving polyacrylonitrile such as maleic anhydride, and also when it consists of formic acid, oxalic acid and water, lower temperatures can be used, especially temperatures between about 80° or 90° and 120° C.; even with these solvents the use of temperatures above 120° C. may sometimes be advantageous, especially when it is desired to obtain a solution of high concentration, e. g. a solution containing 20–25% of polyacrylonitrile.

More rapid solution of the polyacrylonitrile in solvent mixtures containing both formic acid and another organic compound as described above may often be achieved by adding the polyacrylonitrile to formic acid alone or aqueous formic acid in the first place, heating the mixture for example to between 90° and 120° C., and then adding the other component or components of the mixture and stirring until a clear solution has been formed. The added component is preferably first heated to about the same temperature as the polyacrylonitrile and formic acid or aqueous formic acid. Again, if desired the solvent or solvent mixture as a whole may be heated for example to 90° C. or higher before the polyacrylonitrile is added.

When temperatures are used at or above the boiling point of any component of the solvent, a closed vessel capable of withstanding the pressure developed must of course be employed. The solutions once formed, especially solutions of concentration below about 25%, and more particularly about 20% or lower, can in general be cooled considerably without undergoing immediate gelling, though in some cases the cooled solutions may gel if left to stand for a fairly long time.

When the solutions are to be used for the production of one- or two-dimensional shaped articles, such as fibres and films, by extrusion or casting methods, it is preferable that the viscosity of the polyacrylonitrile or other acrylonitrile polymer (measured in 1% solution in dimethyl formamide at 20° C.) should be between about 2.5 and 4 centistokes, and especially between about 3 and 3.5 centistokes. The concentration of the solution is preferably between about 5% and 25%, and especially 7.5–20%, concentrations of 10%–20% being particularly useful.

The shaped articles may be made by a dry-spinning method, in which the solution is extruded or cast into a current of an evaporative medium such as air, preferably heated to above 80°–100° C. or higher, or by a wet-spinning method. When a wet-spinning method is adopted, particularly good results are obtained by using as the coagulating liquid a carboxylic acid ester of boiling point above 250° C., especially a dialkyl phthalate, as described in U. S. application Ser. No. 257,198, filed November 19, 1951, of J. Downing and J. G. N. Drewitt. The spinning solution and coagulating liquid may be at room temperature, but it is usually better that the spinning solution should be at an elevated temperature, especially between about 60° or 70° C. and its boiling point, and that the coagulating liquid should be heated to a temperature approximately equal to or slightly higher than that of the spinning solution. The spinning solution and the coagulating liquid may advantageously both be heated to a temperature above 80° C.

Fibres made in accordance with the invention are preferably oriented by stretching in order to increase their tenacity. A certain degree of stretch may be imparted to the fibres in the course of the spinning operation, but whether this is done or not the fibres are preferably stretched by several times, e. g. by 5–15 times, their length in a subsequent operation. For example wet-spun fibres, after leaving the coagulating bath, may be wound up and washed (e. g. in the form of multi-filament yarns), and then stretched while heated; for example they may be stretched in hot air, wet steam, or water at a temperature above 80° C. as described in British specification No. 636,476, or while they are passed in contact with a hot metal surface, e. g. the surface of a plate or roller kept at about 120°–150° C. To obtain a yarn of the highest tenacity it is advantageous to stretch the fibres as soon as possible after coagulation is complete; for example they may be stretched continuously with their formation, if desired after an intermediate wash with water. If the separate filaments in a multifilament yarn show any tendency to stick together or coalesce during the stretching operation, this can generally be prevented by passing the yarn through an aqueous oil emulsion, or otherwise applying an aqueous oil emulsion to the yarn, before it is heated and stretched, or by carrying out the stretching operation in an aqueous oil emulsion at an elevated temperature, especially at a temperature above 80° C., as described in British specification No. 636,476. After being stretched the fibres may be treated to increase their extensibility by heating them, e. g. to about 140°–200° C., in the absence of tension until no more shrinkage takes place.

Films and like two-dimensional articles made in accordance with the invention may also be stretched to increase their tenacity.

While the solutions of the invention are of particular value in the production of fibres and films and other one- and two-dimensional articles by extrusion or casting methods, they may also be employed for other purposes, e. g. for the production of coatings of acrylonitrile polymers.

The invention is further illustrated by the following examples.

*Example 1*

A polyacrylonitrile made by polymerising acrylonitrile in 18 times its weight of water using as catalyst ammonium persulphate, and having a viscosity (in a 1% dimethyl formamide solution at 20° C.) of about 3.25 centistokes, was heated in a closed vessel to about 130° C. with 6 times its weight of anhydrous formic acid or with the same quantity of 85% aqueous formic acid. In both cases clear solutions were obtained which could be cooled to a considerable extent without gelling.

*Example 2*

The polyacrylonitrile employed in Example 1 was mixed with 6 times its weight of anhydrous formic acid, and the mixture was heated to about 90° C. Maleic anhydride in amount 4 times the weight of the polyacrylonitrile was then added and the temperature further raised to 100° C. and maintained at this value with stirring until a clear solution was obtained.

*Example 3*

The polyacrylonitrile used in Example 1 was added to 8 times its weight of a mixture of equal weights of anhydrous formic acid or 85% aqueous formic acid and ethylene glycol carbonate, and the mixture heated to about 100° C. with stirring until a clear solution was obtained.

*Example 4*

The process of Example 3 was repeated employing as the solvent a mixture of formic acid (30% by weight), oxalic acid (55% by weight) and water (15% by weight).

*Example 5*

The solution obtained in Example 2 was maintained at a temperature of 90° C., and at this temperature was extruded in the form of filaments into a coagulating bath of dibutyl phthalate also maintained at 90° C. The filaments so obtained were formed into a yarn; the yarn was passed over a guide whereby part of the adherent dibutyl phthalate was removed, and was then at once stretched to 6 times its original length while passing over a metal plate heated to 150° C. The stretched yarn was then heated to 130° C. while in a relaxed state and allowed to shrink freely.

Having described our invention, what we desire to secure by Letters Patent is:

1. As a new composition of matter, an acetone-insoluble polymer from the group consisting of polyacrylonitrile, acrylonitrile-vinyl chloride copolymers containing at least 85% of acrylonitrile and no more than 15% of vinyl chloride, and acrylonitrile-methacrylonitrile copolymers containing at least 60% acrylonitrile and no more than 40% methacrylonitrile, dissolved in a solvent mixture consisting of formic acid and a compound selected from the group consisting of maleic, succinic and glutaric anhydrides, gamma butyrolacetone, gamma, and delta-valerolactones and cyclic ethylene carbonate.

2. A composition according to claim 1 wherein the polymer is dissolved in a mixture of 50 to 80% by volume of formic acid and 50 to 20% by volume of maleic anhydride.

3. A composition according to claim 1, wherein the polymer is dissolved in a mixture of 50 to 35% by weight of formic acid and 50 to 65% by weight of cyclic ethylene carbonate.

4. A composition according to claim 1, wherein the polymer has a viscosity, in a 1% by weight solution in dimethyl formamide at 20° C., of 2.5 to 4 centistokes.

5. A process for the production of a new composition of matter, which comprises maintaining an acetone-insoluble polymer from the group consisting of polyacrylonitrile, acrylonitrile-vinyl chloride copolymers containing at least 85% of acrylonitrile and no more than 15% of vinyl chloride, and acrylonitrile-methacrylonitrile copolymers containing at least 60% acrylonitrile and no more than 40% methacrylonitrile, in contact with a solvent mixture consisting of formic acid and a compound selected from the group consisting of maleic, succinic and glutaric anhydrides, gamma butyrolactone, gamma- and delta-valerolactones and cyclic ethylene carbonate at a temperature of 80 to 130° C. until a clear homogeneous solution is formed.

6. A process according to claim 5 wherein the solvent mixture contains 50 to 80% by volume of formic acid and 50 to 20% by volume of maleic anhydride.

7. A process according to claim 5 wherein the solvent mixture contains 50 to 35% by weight of formic acid and 50 to 65% by weight of cyclic ethylene carbonate.

8. A process for the manufacture of fibres, films and other one- and two-dimensional articles, which comprises extruding a composition claimed in claim 1 into a liquid coagulating bath.

9. A process according to claim 8 wherein both the composition and the coagulating bath are at a temperature above 80° C.

References Cited in the file of this patent

UNITED STATES PATENTS

| | | |
|---|---|---|
| 2,210,771 | Myles et al. | Aug. 6, 1940 |
| 2,503,245 | Coover et al. | Apr. 11, 1950 |
| 2,530,962 | Hare | Nov. 21, 1950 |
| 2,588,335 | Dalton | Mar. 11, 1952 |
| 2,607,751 | Flanagan | Aug. 19, 1952 |

FOREIGN PATENTS

| | | |
|---|---|---|
| 638,331 | Great Britain | June 7, 1950 |